United States Patent
Suter

[11] 3,909,728
[45] Sept. 30, 1975

[54] APPARATUS FOR GENERATING A SYNCHRONIZATION VOLTAGE FOR THE IGNITION PULSE CONTROL OF CONTROLLED RECTIFIER-POWER STAGES

[75] Inventor: Hans-Jörg Suter, Rueti near Bulach, Switzerland

[73] Assignee: Contraves AG, Zurich, Switzerland

[22] Filed: Jan. 28, 1974

[21] Appl. No.: 437,755

[30] Foreign Application Priority Data
Feb. 16, 1973 Sweden............................ 732311

[52] U.S. Cl. .................. 328/28; 328/16; 307/229
[51] Int. Cl.² ............................................ H03B 35/00
[58] Field of Search ...... 307/229, 230, 235; 328/28; 330/30 D, 126

[56] References Cited
UNITED STATES PATENTS
| | | | |
|---|---|---|---|
| 3,593,156 | 7/1971 | Jordan | 328/28 |
| 3,631,262 | 12/1971 | Jarrett | 307/229 X |
| 3,657,559 | 4/1972 | Vidovic | 307/229 X |
| 3,772,533 | 11/1973 | Bruckner et al. | 307/229 X |

Primary Examiner—Michael J. Lynch
Assistant Examiner—B. P. Davis
Attorney, Agent, or Firm—Werner W. Kleeman

[57] ABSTRACT

An apparatus for producing a synchronization voltage for the ignition pulse control of a controlled rectifier-power stage from its periodic supply voltage delivered by an autonomous energy supply installation. The inputs of a comparator circuit are electrically coupled via a series connected T-network with the periodic supply voltage. The comparator circuit and the T-network serve to transform the supply voltage into a square wave output alternating-current voltage with predetermined pulse amplitudes and to place the square wave alternating current voltage in phase with the supply voltage. At the output of the comparator circuit there is coupled an RC-element for generating a direct-current average or mean value of the square wave alternating-current voltage. A feedback circuit is provided, the input of which is connected with the capacitor of the RC-element and the output of which is connected with an input of the comparator circuit.

3 Claims, 1 Drawing Figure

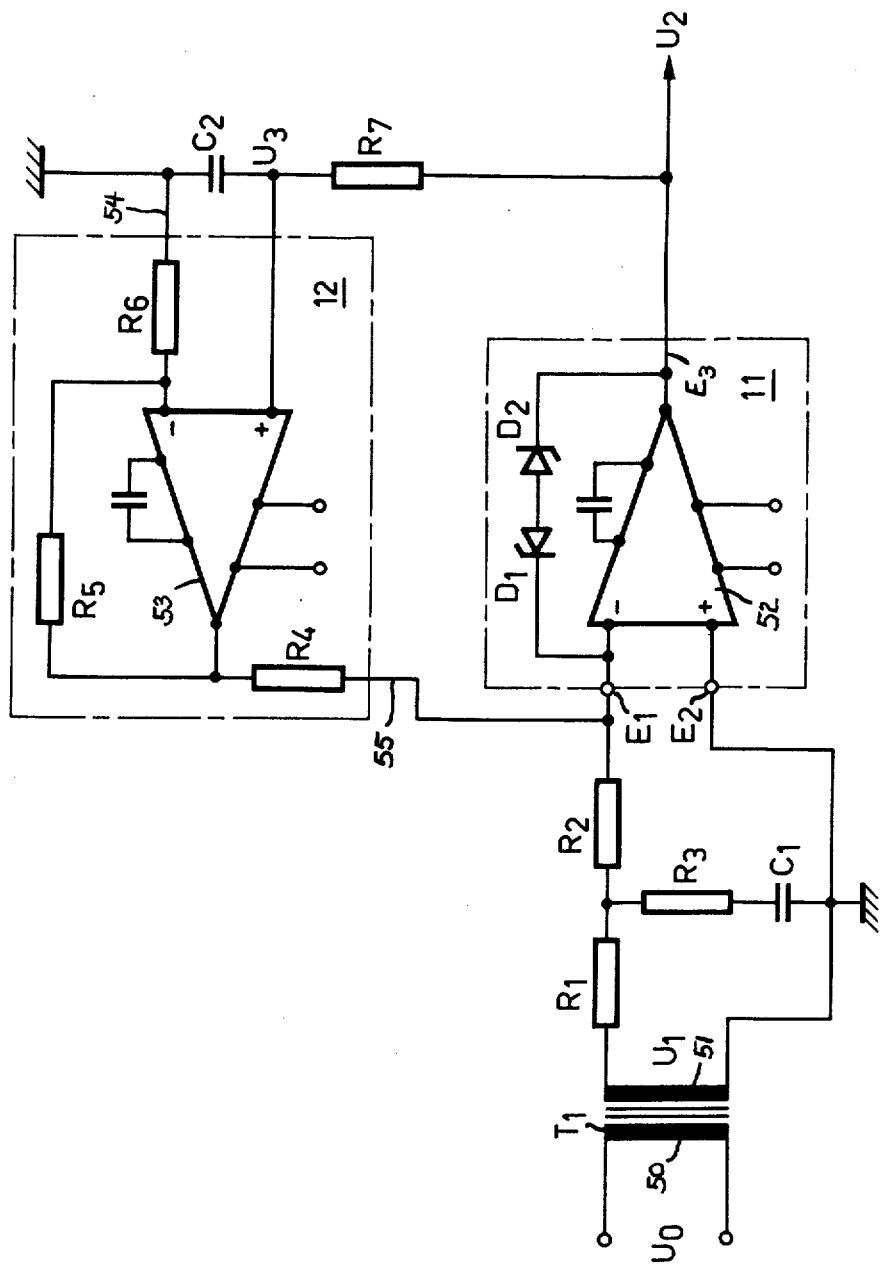

APPARATUS FOR GENERATING A
SYNCHRONIZATION VOLTAGE FOR THE
IGNITION PULSE CONTROL OF CONTROLLED
RECTIFIER-POWER STAGES

BACKGROUND OF THE INVENTION

The present invention relates to a new and improved construction of apparatus for generating or producing a synchronization voltage for the ignition pulse control of a controlled rectifier-power stage from its periodic supply voltage delivered by an autonomous energy supply installation.

With such controlled rectifier-power stages, there are controlled target- and aiming devices with regard to position and elevation at target tracking- and fire command or control systems. These systems are generally supplied by an autonomous energy supply installation consisting of a combustion engine and generators powered thereby, the energy supply installation rendering the system independent of its place of erection or locality. It is known that during loading of such controlled rectifier-power stages which are supplied in this manner, defects arise at the phase voltage due to the phase cut control and consequently the null cross-over of the phase voltage is shifted. This shifting again brings about a displacement of the ignition angle, which influences the output current and as a consequence thereof the defects at the phase voltage and then once again the null cross-over of the phase voltage, in other words, the circuit beings to oscillate.

Now for the purpose of solving this problem, there has been proposed with the heretofore known autonomous energy supply installations with, for instance, three-phase supply generators operating at 400 Hz, to provide each supply generator with a phase-locked separate reference generator. The drawback of this proposal has been found, however, particularly with regard to the adjustment expenditure and the considerable wear of the reference generator which rotates at speeds in the order of about 8000 revolutions per minute. Although with such reference generators the curve envelope or shape of the phase voltage for the ignition pulse control remains unaffected by the loading of the supply generator through the associated power stage and the voltage null cross-over is in synchronism and phase with the original non-loaded supply voltage.

SUMMARY OF THE INVENTION

Hence, it should be recognized that this particular field of technology is still in need of apparatus for generating a synchronization voltage for the firing pulse control of a controlled rectifier-power stage from its periodic supply voltage which is not associated with the aforementioned drawbacks and limitations of the prior art proposals. Therefore, it is a primary object of the present invention to provide such apparatus which effectively and reliably fulfills the existing need in the art.

Another and more specific object of the present invention is concerned with generating a control synchronization voltage of the previously mentioned type without using a separate phase-locked reference generator, and which does not possess any null cross-over displacements which are extensively dependent upon the output current of the power stage.

Now in order to implement these and still further objects of the invention, which will become more readily apparent as the description proceeds, the inventive apparatus of the previously mentioned type is characterized by the features that the inputs of a comparator circuit are electrically coupled with the periodic supply voltage through the agency of a series connected T-network. The comparator circuit and the T-network are constructed and intended to transform the supply voltage into a square wave output alternating-current voltage with predetermined pulse amplitudes and to place the square wave alternating-current voltage in phase with the supply voltage. Furthermore, at the output of the comparator circuit there is connected an RC-element for generating a direct-current voltage average value of the square wave alternating-current voltage, and there is also provided a feedback circuit, the input of which is connected with the capacitor of the RC-element and the output of which is connected with one input of the comparator circuit.

Preferably, two back-to-back connected limiting elements are connected between the output of the comparator circuit and its one input.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE thereof schematically illustrates an exemplary embodiment of apparatus for generating a synchronization voltage for the ignition pulse control of a controlled rectifier-power stage from its periodic supply voltage.

DETAILED DESCRIPTION OF THE PREFERRED EMBODIMENTS

Describing now the drawing, the exemplary embodiment of apparatus for generating a synchronization voltage for the ignition or firing pulse control of the controlled rectifier-power stage from its periodic supply voltage delivered by an autonomous energy supply installation will be seen to comprise a transformer $T_1$, the primary winding 50 of which is connected to a suitable source of a voltage supply $U_0$, for instance operating at 200 volts and 400 Hz, of a not particularly illustrated controlled rectifier-power stage. The sinusoidal-shaped secondary voltage $U_1$ appearing at the secondary winding 51 of the transformer $T_1$ is delivered via a T-network $R_1$, $R_2$, $R_3$, and $C_1$ to the inputs $E_1$ and $E_2$ of a conventional comparator circuit 11. In this comparator circuit 11, which contains the amplifier 52 and back-to-back coupled diodes $D_1$ and $D_2$, the input voltage, which is of sine-shape when there is no load at the output of the power stage, is converted into a square wave alternating-current voltage $U_2$ with predetermined pulse amplitudes, for instance ± 10 volts and a pulse clock ratio or pulse rate ratio of $t_1:t_2 = 1$. The square wave alternating-current voltage $U_2$ is then transformed in conventional manner into a sawtooth wave voltage which is further processed at the ignition pulse control.

Now if the power stage is placed under load, then, as previously mentioned, there occur distortions and null cross-over shifts or displacements at the supply voltage $U_0$. As a consequence thereof, there is also shifted the null cross-over of the square wave alternating-current voltage $U_2$. Since the pulse amplitudes of the square wave alternating-current voltage $U_2$ are maintained at a fixed value by means of the limiting diodes $D_1$ and $D_2$, and by virtue of the momentary null cross-over displacement the voltage $U_2$ now has the pulse rate ratio of $t_1:t_2 \neq 1$, there thus results therefrom a positive or negative direct-current voltage average or mean value of the square wave alternating-current voltage $U_2$. This DC-voltage average value is formed by means of an RC-element $R_7$, $C_2$, connected with comparator circuit output $E_3$ and with a feedback circuit input 54 and which DC-voltage average value is present in the form of a voltage $U_3$ across the capacitor $C_2$.

This voltage $U_3$ is delivered via a conventional feedback circuit 12, containing the amplifier 53 and the resistors $R_4$, $R_5$ and $R_6$, from the feedback circuit output 55 to one input $E_1$ of the comparator circuit 11 in the form of a correction magnitude for the purpose of maintaining the average value of the square wave alternating-current voltage $U_2$ as much as possible at the value null and thus to maintain the pulse rate ratio $t_1:t_2$ at the value 1.

The phase-shifting T-network $R_1$, $R_2$, $R_3$ and $C_1$, connected in series with or ahead of the comparator circuit 11, is dimensioned in such a manner that the leading effect upon the synchronization voltage $U_2$ which is brought about by the RC-element $R_7$, $C_2$ and the feedback circuit 12, is compensated by a corresponding lagging or trailing effect, so that the square wave alternating-current voltage $U_2$ is not only in synchronism with but also in phase with the supply voltage $U_0$ when not under load.

By virtue of this circuit there is prevented that the square wave alternating-current voltage $U_2$ which effective as the synchronization voltage will react to rapid null cross-over fluctuations, that is to say, the influence of the output voltage of the power stage upon the synchronization voltage $U_2$ and the further formed sawtooth voltage is extensively eliminated. If, for instance, with the circuit discussed heretofore, the values of the resistances of the resistors $R_1$ and $R_2$ equals 470 ohms, that of the resistor $R_3 = 68$ ohms, that of the resistor $R_4 = 2.7$ kiloohms, that of the resistor $R_5 = 100$ kiloohmns, that of the resistor $R_6 = 10$ kiloohms, and the capacitance of the capacitor $C_1 = 1$ microfarad and the secondary voltage of the transformer $U_1$ is set to equal 7.8 $V_p$, then from the mathematical evaluation there is attained a reduction factor of about 14 dB for feedback coupled voltage changes $\Delta U_2$.

While there is shown and described present preferred embodiments of the invention, it is to be distinctly understood that the invention is not limited thereto, but may be otherwise variously embodied and practiced within the scope of the following claims.

Accordingly, what is claimed is:

1. An apparatus for generating a synchronization voltage for the ignition pulse control of a controlled rectifier-power stage, comprising supply voltage means for delivering a sinusoidal-shaped alternating-current supply voltage, a comparator circuit having inputs, a T-network electrically connected in circuit between said supply voltage means and said inputs of said comparator circuit, said comparator circuit serving for the transformation of said sinusoidal-shaped alternating-current supply voltage into a square wave alternating-current output voltage of predetermined pulse amplitude and wherein said square wave alternating-current output voltage is in synchronism with said alternating-current supply voltage, said comparator circuit having an output, a series connected RC-element electrically connected in circuit with said output of said comparator circuit for generating a direct-current voltage average value of the square wave alternating-current output voltage, said series connectd RC-element bringing about a phase-lead of said square wave alternating-current output voltage with respect to the sinusoidal-shaped alternating-current supply voltage, a feedback circuit including a feedback amplifier, said feedback circuit including an input means and an output means for said feedback amplifier, the input means of said feedback amplifier being connected in circuit with the capacitor of said series connected RC-element, the output means of said feedback amplifier being connected in circuit with one input of the comparator circuit, said T-network incorporating components for constituting said T-network a phase-trailing electrical network for compensating the phase-lead of the square wave alternating-current output voltage caused by said series connected RC-element, so that said square wave alternating-current output voltage is both in phase and in synchronism with said supply voltage.

2. The apparatus as defined in claim 1, said comparator circuit being equipped with two back-to-back coupled limiting elements connected in circuit between the output of the comparator circuit and said one input.

3. The apparatus as defined in claim 2, wherein the back-to-back coupled limiting elements comprise back-to-back coupled semiconductor diodes.

* * * * *